July 12, 1949.  M. A. WECKERLY  2,475,684
WEIGHING SCALES
Filed Sept. 27, 1946  3 Sheets-Sheet 1
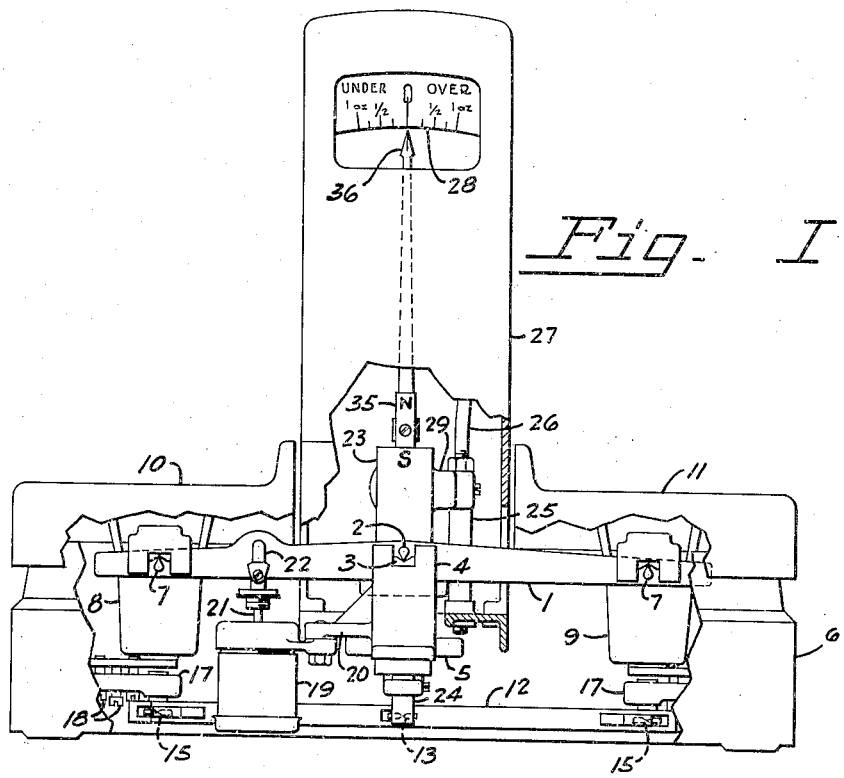
*Fig. I*
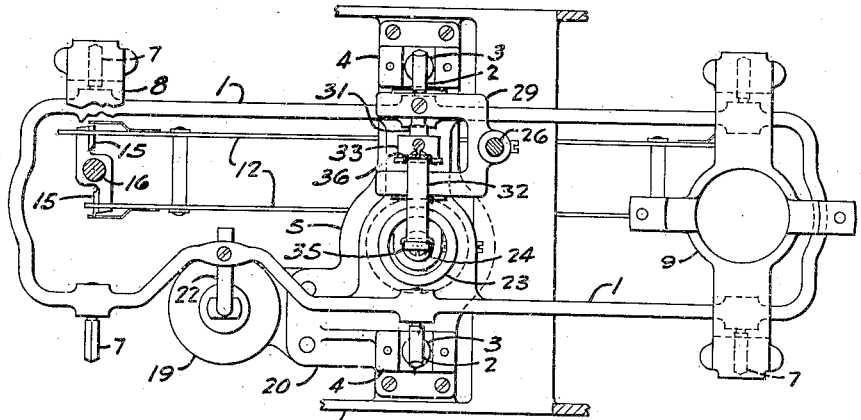
*Fig. II*
INVENTOR.
Mark A. Weckerly
BY
Marshall and Marshall
ATTORNEYS July 12, 1949.  M. A. WECKERLY  2,475,684
WEIGHING SCALES
Filed Sept. 27, 1946  3 Sheets-Sheet 2
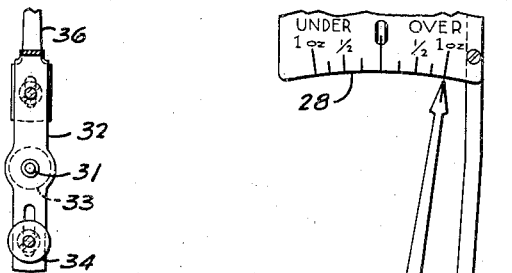
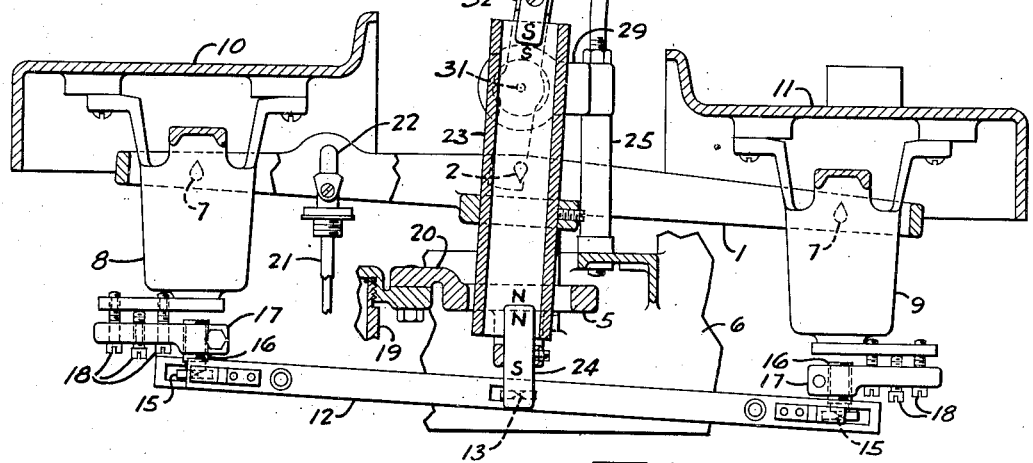
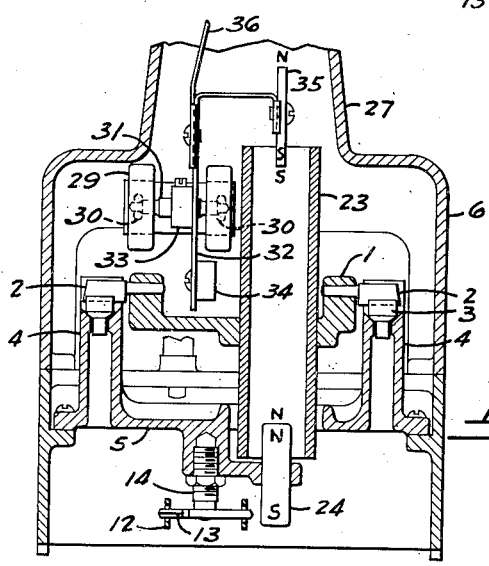
INVENTOR.
Mark A. Weckerly
BY
Marshall and Marshall
ATTORNEYS July 12, 1949.  M. A. WECKERLY  2,475,684
WEIGHING SCALES
Filed Sept. 27, 1946  3 Sheets-Sheet 3
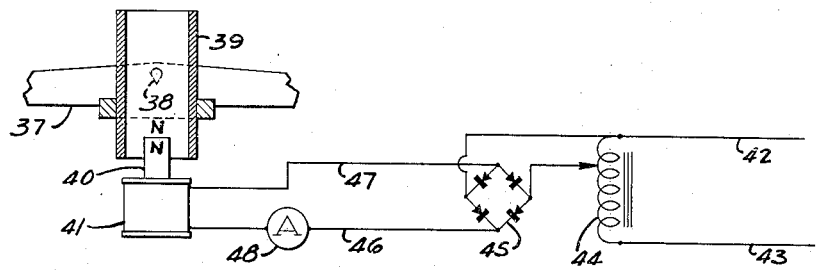
Fig. VI
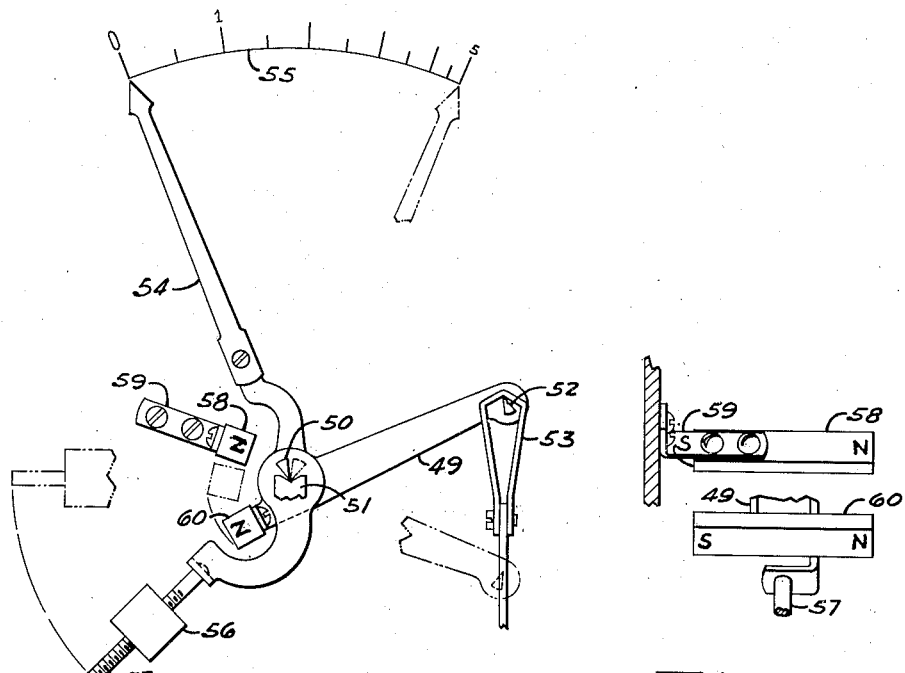
Fig. VII  Fig. VIII
INVENTOR.
Mark A. Weckerly
BY
Marshall and Marshall
ATTORNEYS Patented July 12, 1949

2,475,684

UNITED STATES PATENT OFFICE 2,475,684

WEIGHING SCALES

Mark A. Weckerly, Toledo, Ohio, assignor to Toledo Scale Company, Toledo, Ohio, a corporation of New Jersey Application September 27, 1946, Serial No. 699,687

4 Claims. (Cl. 265—27)

This invention relates to weighing scales, and in particular to a weighing scale employing the interaction between magnetic fields as a load counterbalancing force.

Weighing scales employing pendulums or springs as load counterbalancing elements usually have substantially constant sensitivity, i. e. the indicator travel per unit of weight does not vary greatly throughout the weighing capacity of the scale. It is occasionally desirable that the indicator travel per unit of weight vary widely with load. This occurs when the weighing scale is to have high sensitivity for small loads or small amounts of unbalance, and is to have much less sensitivity for larger loads or greater amounts of unbalance.

The principal object of this invention is to provide an automatic weighing scale whose sensitivity varies widely throughout its weight indicating range.

Another object of the invention is to provide a weighing scale employing magnetic force as a load counterbalancing element.

A still further object of the invention is to provide an automatic weighing scale with a magnetic structure that tends to hold the weighing lever in a central position with a force that increases rapidly as the deflection of the lever increases.

These and other objects and advantages are apparent from the following description in which reference is made to the accompanying drawings.

The invention consists in using the mechanical force arising from the interaction of magnetic fields as a counter-balancing force in a weighing scale. In the examples the force of repulsion between like poles of magnets, preferably permanent magnets, is employed as the load counterbalance. In the preferred form of the invention the configuration of the magnetic field is such that not only does the magnetic field serve as a counterbalance, but also that the field serves to urge the lever along its fulcrum axis in a direction to reduce the load applied to the thrust bearings that prevent lateral movement of the lever.

Weighing scales constructed according to the invention and illustrating various arrangements of magnetic load counter-balancing structures are illustrated in the accompanying drawings.

In the drawings:

Figure I is a front elevation, with parts broken away, of an automatic weighing scale embodying one form of the invention.

Figure II is a plan view of the weighing lever of the scale shown in Figure I.

Figure III is an enlarged vertical section of the weighing scale shown in Figure I.

Figure IV is a fragmentary vertical transverse section taken through the fulcrum axis of the weighing scale shown in Figure III.

Figure V is a fragmentary detail of the indicator drive of the weighing scale.

Figure VI is an alternative form of a magnet for use as a load counterbalancing element.

Figure VII is a generally schematic illustration of still another form of magnetic load counterbalancing structure.

Figure VIII is a fragmentary view of the permanent magnets used as load counterbalancing elements for the weighing scale illustrated in Figure VII.

These specific figures and the accompanying description are intended merely to illustrate the invention, but not to impose limitations on the claims.

In a weighing scale embodying the invention an even-armed main lever 1 has spaced-apart laterally-extending tenon pivots 2 pivotally supported on V-bearings 3 mounted in fulcrum stands 4 that are erected from a bridge 5 spanning the space between the sides of a base housing 6. Load pivots 7 extending laterally from the ends of the lever 1 pivotally support spiders 8 and 9 upon which load receiving platters 10 and 11 are mounted. The spiders 8 and 9 are retained in upright position by check links 12 that are pivotally held against endwise motion by horizontally directed knife edges 13 that are mounted in a post 14 depending from the bridge 5. The ends of the check links 12 engage knife edges 15 extending laterally from posts 16 that depend from brackets 17 which are adjustably secured to the spiders 8 and 9. The adjustment of the brackets 17 with respect to the spiders 8 and 9 is accomplished by selective tightening of one or more of four screws 18, two of which are in tension and two of which are in compression.

A dashpot 19 supported from an extension 20 of the bridge 5 has its plunger stem 21 pivotally attached to a goose-necked bracket 22 extending laterally from the lever 1. The dashpot serves to control the action of the lever and prevent continued oscillations thereof following a change in load or other disturbance.

A tubular permanent magnet 23 (see Figure III) is mounted in the lever 1 with its axis vertical and passing through the fulcrum axis of the lever 1. A cylindrical bar magnet 24 adjustably mounted in the bridge 5 with its axis vertical, is positioned with its upper end extending into the end of the tubular magnet 23. The magnets 23 and 24 are magnetized to form poles at their ends and are oriented so that like poles are adjacent. The repulsion between the like poles of the magnets 23 and 24 tends to move the magnet 23 until the end of the magnet 24 is centered within the opening of the tubular magnet 23. The magnitude of this centering force increases rapidly as the lever 1 and tubular magnet 23 are turned about the fulcrum axis to bring the edge of the magnet 23 into close proximity with the magnet 24. When the lever is horizontal and the bar magnet 24 is centered within the tubular magnet 23, the restoring force is zero and does not change rapidly for small movements of the lever 1. The bridge 5 and the adjacent parts of the scale are made of non-magnetic materials so that no extraneous induced poles will be created which, by distorting the magnetic fields, would introduce errors into the indication.

A post 25 (Figures I and III) erected from a cross tie of the base housing 6 carries on its upper end a stem 26 that, extending upwardly within a hollow indicator tower 27 erected from the housing 6, carries a chart 28 upon which suitable weight indicia are printed.

The post 25 also carries an indicator bearing bracket 29 that is bifurcated to provide spaced apart arms in which ball bearings 30 (see Figure IV) for journaling an indicator shaft 31 are mounted. An L-shaped bracket 32 that is mounted on a hub 33 secured to the indicator shaft 31 carries a balancing weight 34 on the end of its longer arm that extends downwardly below the indicator shaft 31 and carries a small bar magnet 35 at the end of its short transverse arm with the magnet positioned with one end extending into the upper end of the tubular permanent magnet 23 that is carried in the lever 1. An indicator hand 36 is attached to the L-shaped bracket 32 and extends upwardly with its index end lying closely adjacent the chart 28. The magnet 35, carried on the indicator assembly, is oriented so that magnetic repulsion occurs between the magnet 35 and the tubular magnet 23. Since the indicator assembly is balanced, the magnet repulsion forces tend to hold the magnet 35 centered within the upper end of the tubular magnet 23 and thus drive the indicator 36 through a distance that is proportional to the angular deflection or movement of the lever 1. The magnets thus form a substantially friction-free connection between the lever and the indicator. Also since the magnetic connection is much nearer the axis of rotation of the indicator than it is to the fulcrum axis of the lever 1, the angular movement of the indicator 36 is much greater than the angular movement of the lever 1.

The use of magnetic repulsion between the tubular magnet 23 and the bar magnet 24 allows the sensitivity of the scale to be quite high for small unbalance between the weights on the load receivers 10 and 11, while the sensitivity decreases for larger amounts of unbalance. This has the effect of compressing the scale indication in those regions where accurate indication is not needed, and of increasing the sensitivity near zero where precise indications of unbalance are required. The bar magnet 24 may be moved vertically to effect changes in calibration.

Occasionally it is desired or convenient to be able to adjust the sensitivity of a weighing scale without touching or manipulating the scale. One method of accomplishing this result is illustrated by the modification of the invention shown in Figure VI. In this example, a weighing lever 37 fulcrumed on a pivot 38 carries a tubular permanent magnet 39. A core 40 of an electromagnet 41 extends upwardly into the tubular magnet 39 in much the same manner as the bar magnet 24 extends into the tubular magnet 23. The electromagnet 41 is energized through leads 42 and 43 connected to a source of alternating current power. Since it is necessary to employ direct current and to be able to change the magnitude of the current for energizing the electromagnet 41, an adjustable autotransformer 44 and a full-wave rectifier 45 are interposed between the alternating current carrying lines 42 and 43 and the electromagnet 41. In this circuit the adjustable autotransformer 44 permits the voltage applied to the full-wave rectifier 45 to be controlled in amount and thereby control the rectified direct current that flows through leads 46 and 47 connecting the rectifier 45 to the electromagnet 41. An ammeter 48 connected in the lead 46 measures the current flowing in the electromagnet 41 and thus indicates the strength of the magnetic field emanating from the core 40. Varying the strength of the magnetic field by adjusting the autotransformer 44 has the same effect on the sensitivity of this scale as moving the bar magnet 24 vertically through its mounting has on the scale shown in the first example.

As a third example, a weighing scale that employs the repulsion between permanent magnets to counterbalance the force of a load being weighed is illustrated in Figures VII and VIII. In this example a lever 49 that has a fulcrum pivot 50 resting on a bearing 51 has a load knife edge 52 on which a stirrup 53 connected to a load receiver is pivotally supported. An indicator 54 extending upwardly from the lever 49 cooperates with a chart 55 on which suitable indicia may be printed. The lever 49 is brought to neutral equilibrium by adjustment of a weight 56 along a threaded stem 57. Load counterbalancing forces are provided by the magnetic repulsion between the magnetic fields of a stationary bar-shaped permanent magnet 58 carried on a bracket 59 secured to the housing of the scale and a similar bar-shaped permanent magnet 60 that is carried on the lever 49 in generally parallel alignment with the stationary magnet 58 and with like poles adjacent each other. When loads are applied to the stirrup 53 and the lever is rotated clockwise about its fulcrum pivot 50, the bar magnet 60 is carried toward the bar magnet 58. The closer these magnets are brought together the greater is the repulsion force exerted between them. Since the attraction or repulsion of magnetic fields in general varies as the square of the distance between them, the indicator travel per unit of weight is much greater when the magnets are widely separated as when the indicator 54 stands at zero on the chart 55 than is the travel of the indicator 54 near full load when the magnets are brought closely together. Therefore, the graduations on the chart 55 representing equal increments of weight are more widely spaced at the zero end of the chart than they are at the full capacity end of the chart.

The extremely high retentivity of available magnetic alloys allows stable high strength magnets to be produced, which magnets may be employed according to the invention to provide non-linear force counterbalancing forces. The high retentivity minimizes the need for frequent calibration and maintains calibration even though overloads may be applied to the scale. The only effect of an overload is to bring the magnets into contact so that they act as a stop without in any way affecting the accuracy of the device after the overload is removed.

Various modifications of the structure shown in the drawings may be made without departing from the spirit and scope of the invention.

Having described the invention, I claim:

1. In a weighing scale, in combination, a frame, a lever pivotally mounted on the frame, means for applying loads to the lever, a tubular permanent magnet mounted on the lever with its axis extending generally radially to the fulcrum axis of the lever, a magnet mounted on the frame and extending into the tubular magnet, said magnets having like poles adjacent whereby the repulsion of the magnets tends to center the magnet within the tubular magnet and thus counterbalance load, and means for indicating the movement of the lever as a measure of load.

2. In a weighing scale, in combination, a frame, a lever pivotally mounted on the frame, means for applying loads to the lever, a tubular permanent magnet mounted on the lever with its axis extending generally radially to the fulcrum axis of the lever, a permanent magnet adjustably mounted on the frame and extending into the tubular magnet, said magnets having like poles adjacent whereby the repulsion of the magnets tends to center the magnet within the tubular magnet and thus counterbalance load, and means for indicating the movement of the lever as a measure of load.

3. In a weighing scale, in combination, a frame, a lever pivotally mounted on the frame, means for applying loads to the lever, means for applying load counterbalancing force to the lever, a tubular permanent magnet mounted on the lever, an indicator pivotally mounted on the frame, and a magnet carried on the indicator, the magnet being positioned with an end closely adjacent the tubular magnet, the magnets being oriented with like poles adjacent whereby the indicator is positioned with respect to the lever by the repulsive force acting between the magnets.

4. In a weighing scale, in combination, a frame, a lever pivotally mounted on the frame, means for applying loads to the lever, a system of cooperating magnets mounted on the frame and the lever and serving as a counterbalance of load, one pole of one of said magnets having spaced apart portions providing a field having high intensity regions separated by a low intensity region, the other of the cooperating magnets having a like pole positioned in said low intensity region and urged toward the center of such region by repulsion forces acting between the magnets, and an indicator for indicating the position of the lever as a measure of load.

MARK A. WECKERLY.

REFERENCES CITED

The following references are of record in the file of this patent:

UNITED STATES PATENTS

| Number | Name | Date |
|---|---|---|
| 1,707,822 | Stock | Apr. 2, 1929 |
| 1,717,462 | Nagaoka | June 18, 1929 |
| 1,974,940 | Wood | Sept. 25, 1934 |
| 2,148,523 | Baermann | Feb. 28, 1939 |
| 2,201,836 | McCune | May 21, 1940 |
| 2,279,076 | Sutton | Apr. 7, 1942 |
| 2,340,122 | Hansen | Jan. 25, 1944 |
| 2,371,511 | Faus | Mar. 13, 1945 |
| 2,417,339 | Woolley | Mar. 11, 1947 |
| 2,449,283 | Dike et al. | Sept. 14, 1948 |